United States Patent
Nguyen

(10) Patent No.: US 7,005,514 B2
(45) Date of Patent: Feb. 28, 2006

(54) PROCESS FOR PREPARING MICROCRYSTALLINE CELLULOSE

(75) Inventor: Xuan Truong Nguyen, Cincinnati, OH (US)

(73) Assignee: International Paper Company, Stamford, CT (US)

( * ) Notice: Subject to any disclaimer, the term of this patent is extended or adjusted under 35 U.S.C. 154(b) by 377 days.

(21) Appl. No.: 10/271,645

(22) Filed: Oct. 16, 2002

(65) Prior Publication Data

US 2004/0074615 A1    Apr. 22, 2004

(51) Int. Cl.
 *C08B 16/00*    (2006.01)
(52) U.S. Cl. ............................ 536/56; 536/57; 536/124
(58) Field of Classification Search ................. 536/56, 536/57, 124; 426/578
 See application file for complete search history.

(56) References Cited

U.S. PATENT DOCUMENTS

| | | | |
|---|---|---|---|
| 2,978,446 A | | 4/1961 | Battista et al. |
| 3,954,727 A | * | 5/1976 | Toshkov et al. ............... 536/57 |
| 4,427,778 A | | 1/1984 | Zabriskie |
| 4,943,532 A | | 7/1990 | Kawai et al. |
| 5,543,511 A | | 8/1996 | Bergfeld et al. |
| 5,574,150 A | | 11/1996 | Yaginuma et al. |
| 5,589,033 A | | 12/1996 | Tikka et al. |
| 5,769,934 A | | 6/1998 | Ha et al. |
| 6,057,438 A | | 5/2000 | Hyatt et al. |
| 6,228,213 B1 | * | 5/2001 | Hanna et al. .................. 162/18 |
| 6,392,034 B1 | * | 5/2002 | Trusovs ........................ 536/57 |
| 2002/0139498 A1 | * | 10/2002 | Matheson et al. ............ 162/76 |
| 2002/0142032 A1 | * | 10/2002 | Sherwood et al. .......... 424/465 |

OTHER PUBLICATIONS

O.A. Battista, P.A. Smith, "Microcrystalline Cellulouse", Industrial and Engineering Chemistry, vol. 54, No. 9, Sep. 1962, pp. 24; 20-28.
S. Rydholm, "Pulping Process", Textbook of John Wiley & Sons, Inc., 1965, pp. 106-107.
Simmonds et al.,Tappi, vol. 39, No. 9, 1956, pp. 641-647.
Simmonds et al.,Tappi, vol. 38, No. 3, 1955, pp. 178-185.
Richter,Tappi, vol. 38, No. 3, 1955, pp 147; 144, Table XVI and Fig. 15.

* cited by examiner

*Primary Examiner*—James O. Wilson
*Assistant Examiner*—Jason H. Johnsen
(74) *Attorney, Agent, or Firm*—Matthew M. Eslami

(57) ABSTRACT

A process for producing microcrystalline cellulose comprised of the steps of contacting a paper grade pulp with an alkali hydrolysis agent, washing the hydrolyzed pulp and contacting the hydrolyzed pulp with an acid hydrolysis agent and washing the acid hydrolyzed product.

22 Claims, 2 Drawing Sheets

PROCESS FOR PREPARING MICROCRYSTALLINE CELLULOSE

FIELD OF THE INVENTION

The present invention relates to a process for making microcrystalline cellulose (MCC) from paper grade pulp. More particularly the present invention relates to a process for preparing MCC from unpurified, high pentosan and low alpha cellulose paper-grade pulps.

BACKGROUND OF THE INVENTION

MCC is a purified partially de-polymerized crystalline polymer that has many industrial uses. The known commercial processes for making MCC use partial acid hydrolysis of purified cellulose under conditions, at which only the amorphous areas of the polysaccharides are hydrolyzed, dissolved and removed. The crystalline cellulose areas are not hydrolyzed and can be recovered. The acid hydrolysis process is generally considered completed when a level off degree of polymerization ("LODP") cellulose product is obtained. As disclosed in U.S. Pat. No. 2,978,446, starting with purified wood celluloses, such an acid hydrolysis produces MCC with the LODP in the range of 50 to 200. As described in O. A. Battista, P. A. Smith, "Microcrystalline Cellulose," Industrial and Engineering Chemistry, vol. 54, no. 9, p. 24 (September 1962), high alpha cellulose has an average degree of polymerization (DP) of more than 1000 and microcrystalline cellulose has an average DP of about 140 to 190. Also described in S. Rydholm, "Pulping Process," Textbook of John Wiley & Sons, Inc., pp. 106–07 (1965), the average DP of isolated and purified cellulose ranges from 1000 to as high as 5000 depending on the particular wood species and isolation method. Commercial MCC has been specified in US Pharmacopeia (USP 23 NF 18) to contain not less than 97% cellulose.

In the known conventional MCC processes, purified celluloses, such as purified pulps, are used for preparing MCC. These purified pulps are prepared from wood by prehydrolysis of wood chips under acidic conditions, alkali pulping of the prehydrolyzed wood chips and purification of the resultant pulp. As described in Simmons et al., Tappi, vol. 39, no. 9, pp. 641–47 (1956) and Tappi, vol. 38, no. 3, pp. 178–85 (1955), purified pulp is high in alpha cellulose content, in excess of 97%, and contain low levels of hemicellulose or pentosan impurities, less than 2%. Such purified pulps are also commonly known as dissolving pulps and the described method is still being practiced in the industry. Mention is also made of U.S. Pat. No. 5,589,033, which discloses a process to produce a higher quality dissolving pulp in which the hydrolyzate liquor from the prehydrolysis step is removed from the wood chip-cooking vessel, prior to alkali pulping with sodium sulfide and sodium hydroxide.

Dissolving pulps are relatively expensive to produce and their use greatly increases production costs of MCC. Dissolving pulps may be produced from kraft, soda or sulfite pulp by bleaching and other treatments. Dissolving pulps are used as a starting material for a number of products such as viscous rayon, cellulose esters, cellulose ethers, such as taught in Hyatt et al. U.S. Pat. No. 6,057,438. They are also used to make cigarette tow.

When wood chips are not prehydrolyzed before alkali pulping and purification, as described in Richter, Tappi, vol. 38, no. 3, p. 147 (1955) their alpha cellulose content is less than 90% and pentosan content is as high as 10% for softwoods and 20% for hardwoods. Also from Richter, Table XVI and FIG. 15, a cold caustic treatment of unbleached softwood kraft pulp could only reduce its pentosan content from 8.6% to 3.2% and any increase in the caustic concentration of the solution beyond 10–12% resulted in pulps with a higher residual pentosan content.

The basic method for preparing MCC from purified pulps was first described in Battista et al., U.S. Pat. No. 2,978,446, which still represents the basis for many conventional MCC manufacturing processes. In Battista et al. '446 the initial step in the process is the repulping of dry dissolving pulp. The repulped material is then acid hydrolyzed with a mineral acid, such as HCl or $H_2SO_4$ to dissolve the amorphous cellulose. The material is then dried, milled and bagged. This process is generally performed in a batch-type method.

There are a number of disadvantages with the Battista et al. process and other conventional MCC processes. The starting material is required to be a purified cellulose material that is high in alpha cellulose content. For example, the raw material for a commercially available MCC, Avicel®, is stated to be a special grade of alpha purified wood cellulose. Industrial and Engineering Chemistry, vol. 54, no. 5, pp. 20–28. Thus, it would represent a notable advance in the state of the art if the MCC could be prepared from a pulp that was not required to undergo the expensive purification processes of the prior art, such as directly from a paper-grade pulp.

Attempts in the prior art to employ other than purified celluloses have not been well received due to their inherent deficiencies and poor economics. For example, to produce MCC from partially purified cellulose, with an alpha cellulose content of 92.2%, U.S. Pat. No. 5,543,511 discloses a method for producing MCC using pressurized oxygen and/or carbon dioxide and high temperature conditions. From unpurified cellulosic material, U.S. Pat. No. 5,769,934 describes a steam explosion technique to remove lignin and hemicellulose prior to MCC manufacturing.

For preparing MCC from materials containing lignin, hemicellulose and cellulose, U.S. Pat No. 6,228,213 discloses a combination of reactive extrusion in the presence of basic solution followed by reactive extrusion in the presence of acid. The extrusion in the first step, in the presence of sodium hydroxide, is carried out at temperatures ranging from 140° C. to 170° C. The extrusion in the second step, in the presence of an acid, is carried out at a temperature of 140° C. The final extruded product is bleached with hydrogen peroxide or hypochloride prior to being spray dried into MCC powder.

Additionally, acid depolymerization of cellulosic material is known as an essential step in obtaining MCC in order to remove the amorphous cellulose material. One of the other problems with the prior art processes is that when performed on a commercial scale, the acid depolymerization step used in MCC manufacturing requires large quantities of acid. Sulfuric acid is generally used at 50% concentration in order to depolymerize cellulose pulps. Consequently, a large amount of alkaline agent has also been required to neutralize and wash the hydrolyzate after the acid treatment step. Thus, it would represent a significant advance in the state of the art if a process for producing MCC could be developed where the acid and or alkali agents are readily available and could readily be recycled for reuse.

In attempts to move away from acid treatment steps, the prior art has also explored the possibility of using enzymes and/or microorganisms to produce MCC. For example, the previously mentioned Hyatt et al. '438 patent teaches a process for preparing dissolving grade pulps by a process sequence of caustic extraction, xylanase treatment and caustic extraction to remove xylan from the paper grade pulp. The process increases the high alpha cellulose content of the wood pulp from less than 85% to more than 97% and decreases its hemicellulose impurity from more than 15% to less than 3%. In the two extraction stages, the patent teaches that sodium hydroxide concentrations of not more than 8–12% and temperatures of not less than 50–100° C. need to be employed in order to prevent an undesirable transformation of cellulose I into cellulose II structure.

Zabriskie, U.S. Pat. No. 4,427,778 teaches a process for converting cellulose to MCC using a cellulase enzyme. An example of a use of microorganisms for converting cellulose is found in Kawai et al. U.S. Pat. No. 4,943,532. These methods of using enzymes or microorganisms are expensive and require the addition of another reagent not readily available at a paper plant. Thus, there is a need for a process for producing MCC that can employ paper-grade pulp as the starting material and be readily integrated with an existing paper making-plant.

Mention is also made of U.S. Pat. No. 5,574,150 that discloses a process to produce MCC powder with a good balance between compactibility property and rate of disintegration property. The patent also discloses that products with a low apparent specific volume after tapping were said to be more desirable for the tablet manufacturing in the pharmaceutical industry.

SUMMARY OF THE INVENTION

It is therefore an object of the present invention to provide an improved economical process for producing MCC.

It is another object of the present invention to provide a novel process for producing microcrystalline cellulose from bleached paper-grade pulps. Paper-grade pulps can come from hardwood or softwood species and from kraft or soda pulping process, or their improvements, such as, but not limited to, kraft-AQ, kraft-PS-AQ or soda-AQ pulping processes.

It is a further object of the invention is to produce MCC with particles and bulk density properties better than those obtained from previous processes.

It is still another object of the present invention to provide a process of producing MCC that employs less acid and alkali than previous processes.

It is a still further object of the present invention to produce MCC from dry or never-dry paper pulps.

It is yet another object of the present invention to provide a simple, economical and environmentally friendly process for producing MCC that can be used in a variety of applications.

It is still another further object of the present invention to provide a process for producing MCC that can be integrated with or adjacent to an existing pulp mill.

It is yet still another further object of the present invention to provide a process for producing MCC that can co-produce inorganic chemicals and five carbon sugars.

According to the present invention, the foregoing and other objects are achieved by a process wherein paper-grade pulps are sequentially treated with a basic aqueous solution, washing, and treatment with an acid aqueous solution, washing, texturing and spray drying. Producing five carbon sugars and inorganic chemicals can optionally be achieved by means of membrane filtration of the spent liquors to separate and recover organics and inorganics.

To this end, the present invention provides a process for producing microcrystalline cellulose, the process comprising the steps of: (a) contacting a paper grade pulp with an alkali hydrolysis agent at a temperature ranging from about 25 to about 70° C. and at an alkali hydrolysis agent concentration of at least about 30 weight percent based on the weight of the pulp to alkali hydrolyze the pulp; (b) washing the alkali hydrolyzed pulp to remove excess alkali hydrolysis agent and recovering a washed alkali hydrolyzed pulp; (c) contacting the washed alkali hydrolyzed pulp with an acid hydrolysis agent at a temperature of at least about 80° and at an acid hydrolysis agent concentration ranging from about 25 to about 75 weight percent based on the weight of the washed alkali hydrolyzed pulp to produce an acid hydrolyzed pulp; and (d) washing the acid hydrolyzed pulp to remove excess acid hydrolysis agent and recovering a washed acid hydrolyzed pulp comprising microcrystalline cellulose.

DETAILED DESCRIPTION OF THE INVENTION

The following detailed description illustrates a preferred embodiment of the present invention, however, it is not to be construed to limit the scope of the appended claims in any manner whatsoever.

Figure 1:
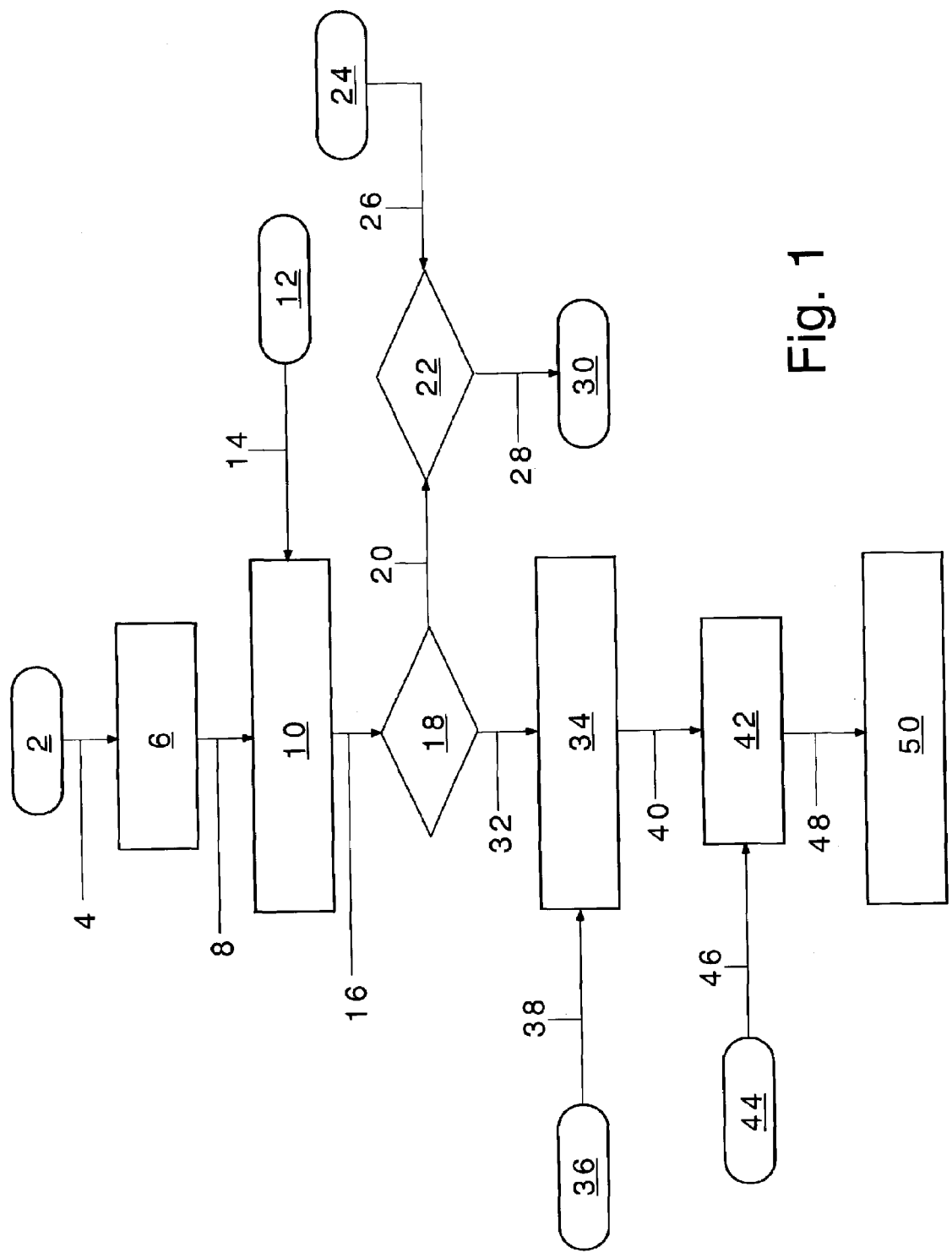
FIG. 1 is a schematic drawing of a prior art conventional MCC manufacturing process.

For comparison purposes, a conventional MCC process is provided in FIG. 1. Referring to FIG. 1 there is shown dissolving (purified) pulp in a feed tank 2. The dissolving pulp is fed via a line 4 to a repulping apparatus 6 where the dissolving pulp is mixed with water and repulped. The repulped dissolving pulp is then fed via a line 8 to an acid hydrolysis reactor 10 that is fed with an acid, such as hydrochloric acid or sulfuric acid or a mixture thereof, from a tank 12 through a line 14. In the acid hydrolysis reactor 10 the amorphous cellulose is dissolved. Typical conditions in the acid hydrolysis reactor include a pulp consistency of about 8%, 50% acid on pulp, residence time of about 60 minutes and a temperature of about 100° C.

The acid hydrolyzed pulp exits via a line 16 into a drum washer 18. In the drum washer the acid hydrolysis liquor is removed in a line 20 to leave a washed pulp at about 12–15% consistency in the drum washer 18. The washed pulp is then pressed to 30–35% consistency and removed via a line 32. The acid hydrolysis liquor is neutralized in tank 22 by addition of lime from tank 24 via a line 26 to a pH of about 7.5 to 8. The neutralized liquor is then removed via a line 28 as effluent 30.

The washed pulp in a line 32 is then texturized and optionally coated with carboxymethylcellulose (CMC) in stage 34. CMC in tank 36 is added via a line 38 and blended with the MCC cake at about 40% solids with 8–10% CMC on pulp. Texturization may be effected by twin screw kneading. The texturized MCC is removed via a line 40 and fed to a dryer 42, such as a spray dryer, fed with aeration gas from source 44 via a line 46. The spray dried MCC powder is then directed via a line 48 for bagging 50.

Figure 2:
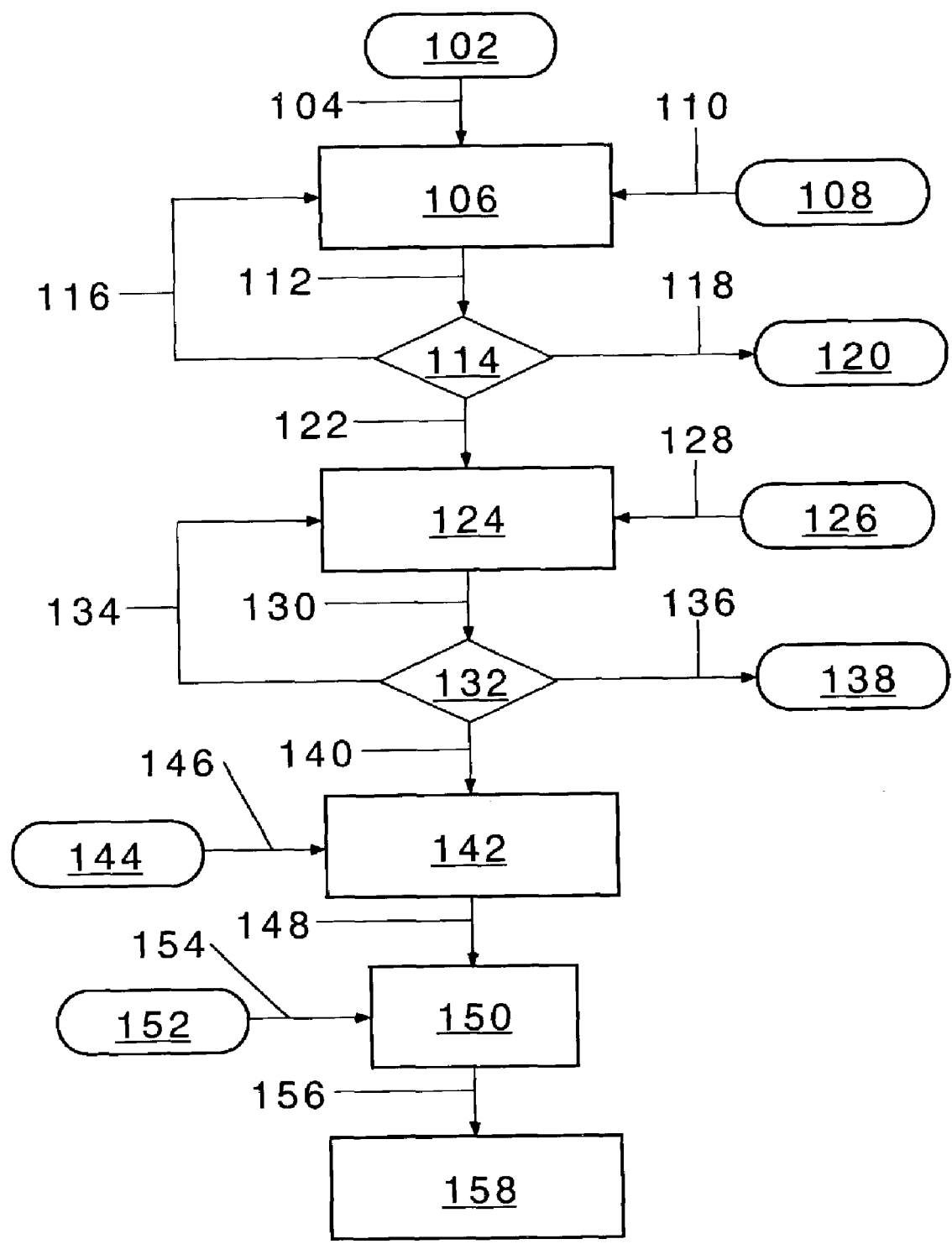
FIG. 2 is a schematic drawing of a preferred embodiment of the process for making MCC from paper grade pulp in accordance with the present invention.

FIG. 2 shows a preferred embodiment of the present invention. A paper grade pulp from a source 102 is used as the starting material. The paper grade pulp can be obtained from a variety of sources as are well known to those skilled in the art. In an especially preferred embodiment, the paper grade pulp feed is a slushed pulp taken directly from an existing bleach plant, such as the last washer stage or high-density storage.

The slushed pulp is fed via a line 104 to an alkali hydrolysis stage 106. In the alkali hydrolysis the pulp is treated with an alkali treating agent, such as NaOH, from source 108 via a line 110. Of course other alkali hydrolysis agents well known to those skilled in the art may be employed, such as ammonium hydroxide and potassium hydroxide. The concentration of alkali treating agent is at least about 30 weight percent based on the weight of the slushed pulp, more preferably at least about 40 weight percent. Most preferred is employing sodium hydroxide as the alkali treating agent in a concentration ranging from about 50 to about 100%.

In the alkali hydrolysis step 106, the use of relatively high concentrations of alkali hydrolysis agent enables substantial dissolution of pentosan and hemicellulose. Additionally, although not required, mercerization of cellulose I to cellulose II can occur during the alkali hydrolysis step. The temperature during the alkali hydrolysis step can range from about 25 to 70° C., more preferably from about 30 to about 60° C., and most preferably is about 40° C. The residence time for the alkali hydrolysis step 14 can vary widely, such as from about 30 to about 120 minutes, preferably about 60 minutes, or an otherwise sufficient amount of time to effect the alkali hydrolysis. The consistency of the pulp during the alkali hydrolysis step preferably ranges from about 3% to about 35% with about 10% being the most preferred.

The alkali hydrolysis agent may be obtained from a variety of sources as is well known to those skilled in the art. In a particularly preferred embodiment of the present invention, the alkali hydrolysis agent is sodium hydroxide and is obtained directly from the pulp mill.

The alkali hydrolyzed pulp product is then directed in a line 112 to a first washing step 114 to remove excess alkali hydrolysis agent and hemicellulose. Any washing apparatus known to those skilled in the art may be employed in the first washing step 114. Preferred is the use of a two-stage drum washer and wash press. The alkali hydrolysis agent can be recovered, optionally with membrane filtration, to separate out the pentosans and hemicellulose, and sent via a line 118 and returned to the pulp mill 120, such as to the bleach plant or recovery boiler of the pulp mill to recover five carbon sugars or other inorganic chemicals by methods known to those skilled in the art. Additionally, recovered alkali hydrolysis agent having had the pentosans and hemicellulose removed, can be directly recycled to the alkali hydrolysis step 106 via a line 116.

The washed alkali hydrolyzed pulp from the washing step 114 is then directed through a line 122 to an acid hydrolysis step 124. In the acid hydrolysis step 124 the pulp is hydrolyzed by addition of an acid hydrolysis agent from a source 126 via a line 128. The acid hydrolysis agent can be any of those well known to those skilled in the art, such as, for example, but not limited to, sulfuric acid, hydrochloric acid and nitric acid. The concentration of acid hydrolysis agent can range from about 25 to about 75 weight percent based on the weight of the alkali hydrolyzed pulp with the preferred concentration ranging from about 35 to about 60 weight percent, most preferably about 50%. The temperature for the acid hydrolysis step typically ranges from about 60° C. to about 120° C. with the preferred ranging being between about 85 and about 95° C. The consistency of the pulp in the acid hydrolysis step generally will range between about 3% and about 35% with the preferred consistency being about 10%. The residence time of the acid hydrolysis step is of a sufficient length to allow acid hydrolysis of the product to occur, typically between about 0.5 and about 5 hours with the preferred residence time ranging between about 1 and about 2 hours.

In the acid hydrolysis step 124, residual pentosans are dissolved and removed from the crystalline cellulose along with any remaining amorphous portion of the cellulose. Acid hydrolysis agent for the acid hydrolysis step can be obtained from any known source 126. However, in especially preferred embodiments of the present invention, the acid hydrolysis agent may be obtained directly from a paper production plant where it may be available as waste acid from a $ClO_2$ generator of the pulp mill or acids used in the existing D1 or D2 stage of the bleach plant of the pulp mill.

The product from the acid hydrolysis step 124 is fed via a line 130 to a washing step 132. Washing can be performed in any suitable apparatus known to those skilled in the art. For example, a two-stage drum washer/wash press may be employed. Spent waste acid is removed via a line 136 and can be sent to the pulp mill to use for the pulp bleaching or a paper production plant 138, known to those skilled in the art. Additionally, the recovered waste acid may be filtered, such as with a membrane filtration step, to remove residual pentosans and amorphous cellulose. The filtered recovered waste acid can be recycled via a line 134 back to the acid hydrolysis step 124.

The product from the washing step 132 may then optionally be texturized in a texturization step 142. Texturization is performed according to methods commonly used in the art. Also during the texturization step 132 a coating, such as carboxymethyl cellulose from a source 144 and fed via a line 146 may be applied according to techniques commonly used in the art.

The product from the texturization step 142 is removed in a line 148 and dried in a drying step 150. Preferably the product is dried with gas from a source 152 and a line 154. In preferred embodiments, a spray dryer or milling flash dryer can be used. In spray drying, as is known to those skilled in the art, a spray dryer comprised of a vertical cylinder with a conical bottom, sprays a slurry of the MCC into the spray dryer wherein it contacts a hot air stream. The consistency of the MCC in the texturized MCC slurry ranges from about 3% to about 35% with about 16% being the most preferred. Typically, the hot air stream enters at the bottom of the chamber and texturized MCC slurry is sprayed downward. The MCC particles are atomized so that the hot air of the spray dryer is able to contact more surface area of the MCC. The spray dryer generally operates at a temperature above about 100° C. to facilitate evaporation of the water.

When a milling flask dryer is used for the MCC drying, the texturization of MCC prior to its drying is not necessary and the texturization step 142 can be omitted. The conistency of the MCC in the MCC slurry feeding the milling flask dryer ranges from about 10% to about 45% with about 35% being the most preferred.

The dried MCC is removed from the spray dryer 150 in a line 156 and bagged in a bagging step 158 according to techniques commonly used in the art.

EXAMPLES

The following examples are provided to illustrate the present invention. They are not to be construed to limit the appended claims in any manner whatsoever.

Example 1

Vivapour, a commercial powder MCC product of J. Rettenmairer & Sohne of softwood species, was analyzed and found to contain 96.1% cellulose and 3.65% hemicelluloses. The same sample was found to have an intrinsic viscosity of 1.15 dL/g, corresponding to a DP of 138, bulk density of 0.34 gm/cc and of all the particles in the sample, 15.3% is smaller than 38 microns. A similar MCC product of the same company from hardwood species was found to contain 98.5% cellulose and 1.2% hemicelluloses.

Example 2

Aviloid, a commercial MCC powder product from FMC was analyzed and found to have a bulk density of 0.6 gm/cc and 30.3% of all particles of size smaller than 38 microns. The same sample was soaked overnight with water and subsequently centrifuged for 10 minutes at 5000 G centrifugal force to remove all excess water. The residual water content of the resultant sample or water retention value (WRV) was found to be 0.601 grams of $H_2O$ per grams of dry material.

Example 3

Estercell, a dried commercial dissolving pulp product from IP, was analyzed and was found to contain 97.9% cellulose, 1.93% hemicelluloses, 1.4% pentosan and a WRV of 1.4 g/g. The same pulp sample was also found to have an intrinsic viscosity of 6.16 dL/g, corresponding to a DP of 880. The same dissolving pulp product has been used as the raw material by the MCC manufacturing industry for the making of MCC powder.

Example 4

A dried commercial market paper pulp product from mixed hardwood species from IP, was analyzed and was found to contain 79.1% cellulose, 20.2 % hemicelluloses, 19.3% pentosan and have a WRV of 1.530 g/g and an intrinsic viscosity of 9.12 dL/g, corresponding to a DP of 1357.

Example 5

A dried commercial softwood paper pulp product from IP, was analyzed and was found to contain 85.1 % cellulose, 14.8 % hemicelluloses, 9.3% pentosan and have a WRV of 1.524 g/g. The same pulp sample was found to have an intrinsic viscosity of 6.53 dL/g, corresponding to a DP of 938.

Example 6

100 grams of hardwood paper pulp sample used in example 4 was reslushed with 900 gram water to obtain a pulp suspension of 10% consistency, defined as dry weight of fiber over combined weight of dry fiber plus weight of water. 90 gram of sodium hydroxide was subsequently added to the pulp suspension. The pulp slurry was mixed well, put in a sealed plastic bag and placed in a constant temperature bath at 60° C. for 1 hour. After 1 hour, the pulp slurry was dewatered and well washed to remove all dissolved organics and inorganics from the alkali treated pulp. After dewatering and drying, 86.1 grams of dried solid was obtained from the original 100 grams of paper pulp. The solid material was subsequently analyzed and found to contain 93.8% cellulose, 5.8% hemicelluloses, 3.9% pentosan and have an intrinsic viscosity of 8.83 dL/g. The results indicate that the envisaged alkali treatment stage removes more than 71% of the hemicelluloses in the original pulp. The treatment also increases its cellulose content from 79.1% to as high as 93.8% while having very small impact on its intrinsic viscosity.

Example 7

The experiments of example 6 were repeated at a temperature of 25° C. instead of at 60° C. The solid material yield was 88 grams and its pentosan content was 4.1%. The example results indicate that a decrease in the temperature of the alkali treatment stage from 60° C. to 25° C. has very small impact on the efficiency of the intended hemicelluloses removal process through alkali hydrolysis.

Example 8

Hardwood paper pulp was alkali treated according to example 7. After washing and dewatering, it was reslushed with water to a consistency of 10%. Sulphuric acid was then added to the slurry to obtain an acid charge of 50% weight of acid per weight of alkali treated pulp. The resultant mixture was sealed in a plastic bag and placed in a constant temperature bath at 85° C. for 4 hours. After 4 hours, the slurry was dewatered and well washed to remove all dissolved organics and inorganics from the treated the acid treated solid. After dewatering and drying, 78.5 grams of dried solid, called dried MCC paste was obtained from the original 100 grams of hardwood paper pulp. The dried MCC paste was analyzed and was found to contain 96.6% cellulose, 3.3% hemicelluloses, 3.1% pentosan and intrinsic viscosity of 1.05 dL/l, corresponding to a DP of 125.

Example 9

Experiments in example 8 were repeated at a temperature of 95° C. for 2 hours. The corresponding MCC paste was found to have an intrinsic viscosity of 0.80 and contain 3.0% pentosan. Results indicate that a higher operating temperature can be used to shorten the time require to complete the acid hydrolysis process.

Example 10

The experiments of example 7 and example 8 were repeated. Instead of hardwood paper pulp as described in example 4, softwood paper pulp as described in example 5 was used for these experiments. The solid material yield after the alkali treatment stage was 92.9 grams and the alkali treated material was found to contain 94.5% cellulose, 5.5% hemicelluloses and 2.5% pentosan. After the subsequent acid treatment stage, the solid material yield from the original 100 grams of softwood paper pulp was 84.5 grams. The corresponding dried MCC paste was found to contain 96% cellulose, 4% hemicelluloses, 1.7% pentosan and have an intrinsic viscosity of 0.82 dL/g, corresponding to a DP of 95.

Example 11

Hardwood MCC paste was prepared according to example 9. The solid content of the MCC paste after washing and dewatering from commercial equipment was 16%. A commercial paper pulp repulper device was subsequently used to transform the MCC paste into a milky and viscous slurry of small MCC particles. A commercial spray dryer system was then used to transform the MCC slurry into MCC powder. The dryer was operated with 500° F. at the inlet and 150° F. at the outlet. The resultant dried MCC powder product was found to have an average particle size of 45 microns and powder bulk density of 0.25 g/cm$^3$. 69.7% of all MCC particles in the powder product were found to be smaller than 38 microns. The MCC product as prepared was found to have a WRV of 0.33 g/g.

Example 12

Experiments of example 11 were repeated with softwood MCC paste, prepared with softwood paper pulp according to example 10. The resultant dried softwood MCC powder product was found to have an average particle size of 38 microns, including 75.8% of all particles smaller than 38 microns, a powder bulk density of 0.41 g/cm$^3$ and WRV of 0.34 g/g.

Example 13

Hardwood MCC paste was prepared according to example 9. The solid content of the MCC paste after washing and dewatering from a commercial washpress was 40%. The 40% solid paste was directly fed into a commercial Flash Milling Dryer, operating at 600° F. and 5 psig in the inlet manifold and 180° F. in the outlet. The resultant dried MCC powder was found to have an average particle size of 50 microns and a bulk density of 0.45 g/cm$^3$.

The above-mentioned patents are all incorporated by reference. Many variations of the present invention will suggest themselves to those skilled in the art. All such obvious variations are within the full intended scope of the appended claims.

What is claimed is:

1. A process for producing microcrystalline cellulose, said process comprising the steps of:
   a) contacting a paper grade pulp with an alkali hydrolysis agent at a temperature ranging from about 25 to about 70° C. and at an alkali hydrolysis agent concentration of at least about 30 weight percent based on the weight of said pulp to alkali hydrolyzed pulp;
   b) washing said hydrolyzed pulp to remove excess alkali hydrolysis agent and recovering a washed alkali hydrolyzed pulp;
   c) contacting said washed alkali hydrolyzed pulp with an acid hydrolysis agent at a temperature of least about 80° C. and at an acid hydrolysis agent concentration ranging from about 25 to about 75 weight percent based on the weight of said washed alkali hydrolyzed pulp to produce an acid hydrolyzed pulp; and
   d) washing said aid hydrolyzed pulp to remove excess said hydrolysis agent and recovering a washed acid hydrolyzed pulp comprising microcrystalline cellulose.

2. A process as defined in claim 1 wherein said temperature of said alkaline hydrolysis step ranges about 30 to 40° C.

3. A process as defined in claim 1 wherein said concentration of said alkali hydrolysis agent is greater than about 40%.

4. A process as defined in claim 3 wherein the said concentration of said alkali hydrolysis agent is greater than about 50%.

5. A process as defined in claim 1 wherein said alkali hydrolysis agent comprises NaOH.

6. A process as defined in claim 1 wherein said process is performed within an existing paper production plant.

7. A process as defined in claim 1 wherein said paper grade pulp is obtained directly from a washer of a bleach plant, high density storage or a combination thereof.

8. A process as defined in claim 6 wherein said excess alkaline hydrolysis agent is sent to a bleach recovery stage of the paper production plant.

9. A process as defined in claim 1 wherein said alkaline hydrolysis agent washing step is performed in a two stage washer/wash press.

10. A process as defined in claim 8 alkaline hydrolysis agent washing step further comprises membrane filtration of the excess alkaline hydrolysis agent.

11. A process as defined in claim 1 wherein the acid hydrolysis agent comprises $H_2SO_4$.

12. A process as defined in claim 1 wherein the concentration of said aid hydrolysis agent ranges from about 35 to about 65 weight percent based on the weight of said alkali hydrolyzed pulp.

13. A process as defined in claim 1 wherein said acid hydrolysis step is carried out at a temperature greater than about 90° C.

14. A process as defined in claim 13 wherein said acid hydrolysis temperature is greater than about 95° C.

15. A process as defined in claim 6 wherein said acid hydrolyzing agent is recycled to a bleach plant of a pulp and paper mill.

16. A process as defined in claim 6 wherein excess acid hydrolysis agent is recycled to a bleach plant of a pulp and a paper mill.

17. A process as defined in claim 1 wherein said acid washing step is performed in a multi-stage washer/wash press.

18. A process as defined in claim 1 further comprising coating the product from the acid washing step with carboxy methyl cellulose.

19. A process as defined in claim 1 further comprising coating the product from the acid washing step with methyl cellulose.

20. A process as defined in claim 1 further comprising drying the product of the acid washing step.

21. A process as defined in claim 20 wherein said drying step comprises spray drying.

22. A process as defined in claim 20 wherein said drying step comprises milling flash drying.

* * * * *